United States Patent
Patil

(10) Patent No.: US 10,601,739 B2
(45) Date of Patent: *Mar. 24, 2020

(54) SMART MESSAGING FOR COMPUTER-IMPLEMENTED DEVICES

(71) Applicant: salesforce.com, inc., San Francisco, CA (US)

(72) Inventor: Dipak Patil, Miraj (IN)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/200,351

(22) Filed: Nov. 26, 2018

(65) Prior Publication Data

US 2019/0097955 A1    Mar. 28, 2019

Related U.S. Application Data

(63) Continuation of application No. 15/672,761, filed on Aug. 9, 2017, now Pat. No. 10,205,684, which is a continuation of application No. 15/090,177, filed on Apr. 4, 2016, now Pat. No. 9,749,267, which is a
(Continued)

(51) Int. Cl.
| | |
|---|---|
| *H04L 12/58* | (2006.01) |
| *G06N 99/00* | (2019.01) |
| *G06Q 10/10* | (2012.01) |
| *G06F 17/27* | (2006.01) |
| *G06N 5/04* | (2006.01) |
| *G06N 20/00* | (2019.01) |
| *G06F 40/274* | (2020.01) |

(52) U.S. Cl.
CPC ............ *H04L 51/02* (2013.01); *G06F 40/274* (2020.01); *G06N 5/04* (2013.01); *G06N 20/00* (2019.01); *G06Q 10/10* (2013.01); *G06Q 10/107* (2013.01)

(58) Field of Classification Search
CPC .... G06F 17/276; G06Q 10/107; G06Q 10/10; G06N 20/00; G06N 5/04; H04L 51/02
See application file for complete search history.

(56) References Cited

U.S. PATENT DOCUMENTS

| 8,521,823 B1 * | 8/2013 | Sheinberg | G06Q 10/107 |
| | | | 709/206 |
| 2003/0126090 A1 * | 7/2003 | Fukuoka | G06Q 10/10 |
| | | | 705/54 |

(Continued)

*Primary Examiner* — Abdullahi E Salad
(74) *Attorney, Agent, or Firm* — LKGlobal | Lorenz & Kopf, LLP

(57) ABSTRACT

Various computer-implemented systems and methods are provided here for purposes of smart messaging. A machine learning application can obtain message context data from a user device, and process the message context data to determine a predicted conversation pattern of the conversation. The message context data is indicative of context of a conversation taking place during a messaging session. Based on the predicted conversation pattern, the machine learning application can then determine options for suggested responses that are predicted to compete at least part of a response message as part of the conversation. Each of the options for suggested responses corresponds to the message context data indicative of the context of the conversation. In response to selection of one of the suggested responses, that suggested response can be displayed within a message field.

23 Claims, 5 Drawing Sheets

Related U.S. Application Data continuation of application No. 13/396,447, filed on Feb. 14, 2012, now Pat. No. 9,306,878.

(56) References Cited

U.S. PATENT DOCUMENTS

| | | | |
|---|---|---|---|
| 2009/0249198 A1* | 10/2009 | Davis | G06F 17/276 715/261 |
| 2010/0082751 A1* | 4/2010 | Meijer | G06F 15/16 709/206 |
| 2010/0159883 A1* | 6/2010 | Pascal | H04L 51/04 455/412.1 |
| 2010/0223341 A1* | 9/2010 | Manolescu | H04L 51/32 709/206 |
| 2011/0153686 A1* | 6/2011 | Campbell | G06Q 30/02 707/812 |
| 2011/0208816 A1* | 8/2011 | Chavez | G06Q 10/107 709/206 |
| 2011/0302249 A1* | 12/2011 | Orr | G06Q 10/107 709/206 |
| 2012/0005221 A1* | 1/2012 | Ickman | G06F 16/24575 707/769 |

* cited by examiner

SMART MESSAGING FOR COMPUTER-IMPLEMENTED DEVICES

CROSS-REFERENCE TO RELATED APPLICATIONS

This application is a continuation of U.S. patent application Ser. No. 15/672,761, filed Aug. 9, 2017, which is a continuation of U.S. patent application Ser. No. 15/090,177, filed Apr. 4, 2016 (and issued on Aug. 29, 2017 as U.S. Pat. No. 9,749,267 B2), which is a continuation of U.S. application Ser. No. 13/396,447, filed Feb. 14, 2012 (and issued on Apr. 5, 2016 as U.S. Pat. No. 9,306,878 B2).

TECHNICAL FIELD

Embodiments of the subject matter described herein relate generally to messaging systems such as text messaging systems, instant messaging systems, and chat systems. More particularly, embodiments of the subject matter relate to an intelligent messaging system that automatically generates template messages, or portions thereof, on behalf of the user.

BACKGROUND

Instant messaging, live chatting, and text messaging have become very common in everyday life. Depending upon the participants, the context of the conversation, and the subject matter being discussed, the content of a given message may be relatively brief or relatively complex. Long and complicated messages can be very time consuming and difficult to enter. Moreover, certain messaging contexts tend to occur more frequently than others. For example, a small group of coworkers may participate in a typical "lunch initiation" conversation almost every workday at noon. As another example, members of a family may engage in a typical "when will you be home" conversation almost every day at dinnertime.

Accordingly, it is desirable to have an efficient and effective mode of entering content for a messaging system, such as an instant messaging system. Furthermore, other desirable features and characteristics will become apparent from the subsequent detailed description and the appended claims, taken in conjunction with the accompanying drawings and the foregoing technical field and background.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
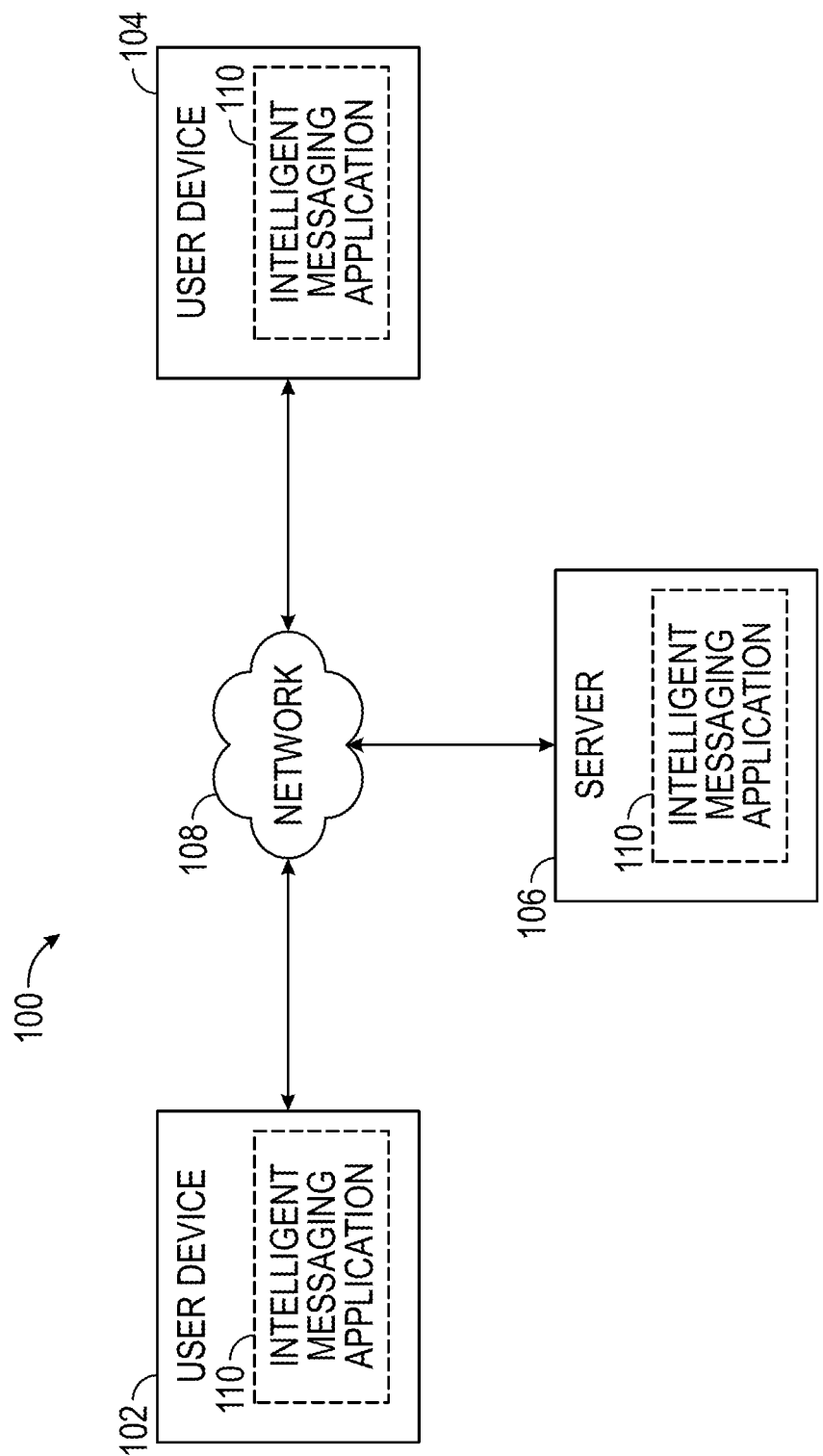
FIG. 1 is a schematic representation of an exemplary embodiment of a messaging system.

The exemplary embodiments presented here relate to a computer-implemented messaging system, such as an instant message (IM) system, a live chat system, a text messaging system, a message posting feature of a social networking website, or the like. The techniques and methodologies presented here analyze data and information that is indicative of the current contextual scenario associated with a messaging session, which may involve any number of participants. More specifically, the intelligent processing techniques described in more detail herein can be employed to anticipate, predict, or estimate certain characteristics, traits, or language patterns of a messaging session. The smart prediction techniques can be used to automatically generate a conversation template, suggested message content, proposed language, sentences, or clauses, or the like. As a result of the smart prediction technology, the end user need not manually enter common phrases, salutations, or conversation content when engaging in an accurately predicted conversation. Instead, the IM system itself generates some or all of the messaging content on behalf of the user.

When two or more people chat using an IM system, they often begin the conversation with typical greetings, formalities, or lines of text. Moreover, certain common or frequently sent messages prompt a similar, identical, or equivalent reaction or response from a participant in the conversation. For example, routine and common IM conversations between two known people may begin and end in a similar fashion frequently or often enough to be statistically significant.

In accordance with one common scenario, if a user is communicating with a manager, a supervisor, or another person of respect or authority, the IM conversation may proceed in a predictable manner. For example, the IM conversation may proceed as follows:

MARK: Hello Mr. Jones, how are you?
MR. JONES: Hi Mark, I'm fine. What's going on?
- - -
- - -
MARK: Thank you, Mr. Jones. Goodbye.

The dashed lines in the above example represent the bulk of the IM conversation between Mark and Mr. Jones. Notably, Mark begins and ends the conversation with somewhat formal language that reflects the seniority of Mr. Jones. Thus, it is safe to assume that Mark will usually begin and end a conversation with Mr. Jones in such a formal manner.

As another example, if a user is communicating with a peer or a friend, there may be a less formal exchange, as follows:

DIANE: Hello Jack.
JACK: Hi.
DIANE: Can we set up a meeting?
JACK: Sure. See you at noon.
DIANE: OK. Thanks.

As yet another example, a person may frequently try to gather a group of people for lunch at a certain time of the day. Indeed, certain groups of people tend to have lunch together as a daily routine. Lunch invitations may proceed using IM as follows:

STEVE: Anyone going to lunch?
JOHN: Yeah
MARK: Where?
STEVE: Let's meet at Sally's Sandwich Shop As another example, when a person chats informally with a close friend, the conversation is usually informal, funny, and/or personal in nature:

FRANK: What's up, dude?

DAVE: Hey, doing good.

FRANK: What are you doing after work?

Notably, there is often some type of detectable pattern, content, language, and/or context in messages between people, especially if the same identifiable people use the messaging system on a frequent and predictable basis. The system and methodology described here leverages this phenomena and dynamically learns the conversation patterns, habits, and tendencies between people or between groups of people (e.g., conferences using IM). The intelligent learning technique can be used to recommend, suggest, or otherwise provide message text or content at appropriate stages of a conversation between people. In certain embodiments, the intelligent learning technique can be used to generate template messages that can thereafter be edited as needed by the user before sending the messages. These "shortcut" techniques allow the IM conversation to proceed as usual while saving time that would otherwise be devoted to text entry.

Referring now to the drawings, FIG. 1 is a schematic representation of an exemplary embodiment of a messaging system 100. Although certain embodiments described here relate to an IM system, the techniques and methodologies can be utilized in other types of messaging systems including, without limitation, live chat systems, text messaging systems, and the like. Accordingly, the IM system presented here represents only one possible embodiment of the messaging system 100, which leverages intelligent predictive messaging techniques. The illustrated embodiment of the system 100 includes a first user device 102, a second user device 104, and a messaging server system 106 operatively coupled to each other through a data communication network 108. The system 100 is preferably realized as a computer-implemented system in that the user devices 102, 104 and the messaging server system 106 are configured as computer-based electronic devices.

Although only two user devices 102, 104 are shown in FIG. 1, an embodiment of the system 100 could support any number of user devices. Each user device supported by the system 100 may be implemented using any suitable hardware platform. In this regard, a user device may be realized in any common form factor including, without limitation: a desktop computer; a mobile computer (e.g., a tablet computer, a laptop computer, or a netbook computer); a smartphone; a video game device; a digital media player; a piece of home entertainment equipment; or the like. Each user device supported by the system 100 is realized as a computer-implemented or computer-based device having the hardware, software, firmware, and/or processing logic needed to carry out the intelligent messaging techniques and methodologies described in more detail herein.

The messaging server system 106 can be deployed in certain embodiments of the system 100 to manage, handle, and/or serve some or all of the intelligent messaging functionality for the user devices. In practice, the messaging server system 106 may be realized as a computer-implemented or computer-based system having the hardware, software, firmware, and/or processing logic needed to carry out the intelligent messaging techniques and methodologies described in more detail herein. It should be appreciated that the messaging server system 106 need not be deployed in embodiments where the user devices perform the intelligent messaging functionality. In other words, the methodology described herein could be implemented at the local client device level without relying on any centralized processing at the server level.

The system 100 includes an intelligent messaging application 110, which may be realized at the user device 102 only, at the user device 104 only, at the messaging server system 106 only, or distributed across any of the user devices 102, 104 and the messaging server system 106. The intelligent messaging application 110 is responsible for smart messaging prediction, messaging scenario analysis, message content suggestions, and/or other messaging functions of the system 100. To this end, the user devices 102, 104 may include or cooperate with the intelligent messaging application 110, which provides the features and functionality associated with the processing, generation, sending, and receiving of messages. As mentioned above, the system 100 may support one or more of the following message types, without limitation: IM; live chat; text messages; SMS; website wall posting; blog postings; or the like.

The data communication network 108 provides and supports data connectivity between the user devices 102, 104 and the messaging server system 106. In practice, the data communication network 108 may be any digital or other communications network capable of transmitting messages or data between devices, systems, or components. In certain embodiments, the data communication network 108 includes a packet switched network that facilitates packet-based data communication, addressing, and data routing. The packet switched network could be, for example, a wide area network, the Internet, or the like. In various embodiments, the data communication network 108 includes any number of public or private data connections, links or network connections supporting any number of communications protocols. The data communication network 108 may include the Internet, for example, or any other network based upon TCP/IP or other conventional protocols. In various embodiments, the data communication network 108 could also incorporate a wireless and/or wired telephone network, such as a cellular communications network for communicating with mobile phones, personal digital assistants, and/or the like. The data communication network 108 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol.

Figure 2:
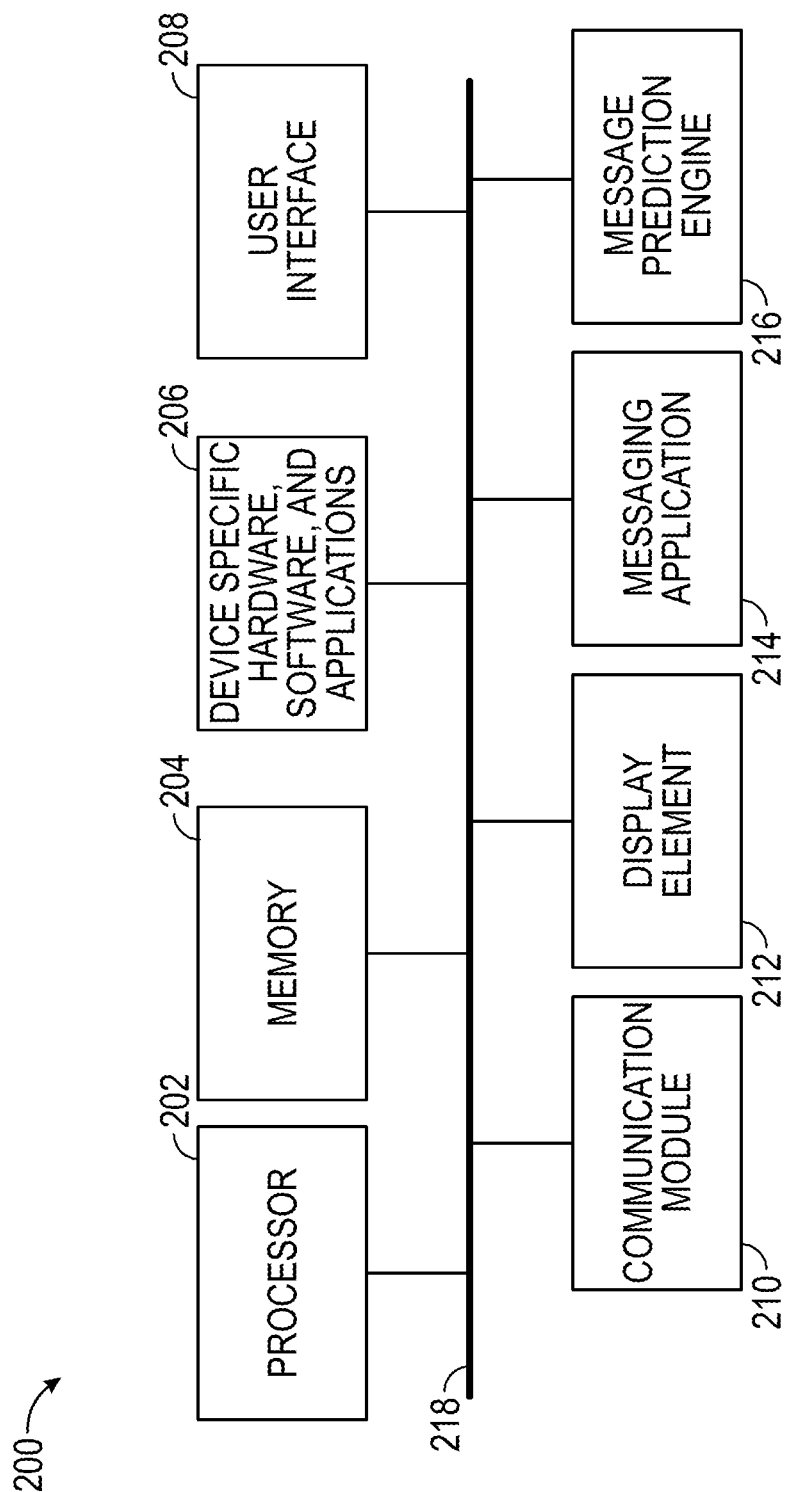
FIG. 2 is a schematic representation of an exemplary embodiment of an apparatus suitable for use in a messaging system such as that depicted in FIG. 1.

FIG. 2 is a schematic representation of an exemplary embodiment of an apparatus, system, or device 200 suitable for use in a messaging system such as that depicted in FIG. 1. In practice, the user devices 102, 104 and the messaging server system 106 could be generally configured and implemented as shown in FIG. 2. Thus, the following general description of the device 200 may be applicable to the user device 102, the user device 104, and/or the messaging server system 106.

The illustrated embodiment of the device 200 includes, without limitation: at least one processor 202; a suitable amount of memory 204; device-specific hardware, software, firmware, and/or applications 206; a user interface 208; a communication module 210; a display element 212; a messaging application 214; and a message prediction engine 216. Of course, the device 200 may include additional elements, components, modules, and functionality configured to support various features that are unrelated to the subject matter described here. For example, the device 200 may include certain features and elements to support conventional functions that might be related to the particular implementation and deployment of the device 200. In practice, the elements of the device 200 may be coupled together via a bus or any suitable interconnection architecture 218.

The processor 202 may be implemented or performed with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. A processor may be realized as a microprocessor, a controller, a microcontroller, or a state machine. Moreover, a processor may be implemented as a combination of computing devices, e.g., a combination of a digital signal processor and a microprocessor, a plurality of microprocessors, one or more microprocessors in conjunction with a digital signal processor core, or any other such configuration.

The memory 204 may be realized as RAM memory, flash memory, EPROM memory, EEPROM memory, registers, a hard disk, a removable disk, a CD-ROM, or any other form of storage medium known in the art. In this regard, the memory 204 can be coupled to the processor 202 such that the processor 202 can read information from, and write information to, the memory 204. In the alternative, the memory 204 may be integral to the processor 202. As an example, the processor 202 and the memory 204 may reside in an ASIC. The memory 204 can be used to store computer-readable media, where a tangible computer-readable medium has computer-executable instructions stored thereon. The computer-executable instructions, when read and executed by the device 200, cause the device 200 to perform certain tasks, operations, functions, and processes described in more detail herein. In this regard, the memory 204 may represent one suitable implementation of such computer-readable media. Alternatively or additionally, the device 200 could receive and cooperate with computer-readable media (not separately shown) that is realized as a portable or mobile component or platform, e.g., a portable hard drive, a USB flash drive, an optical disc, or the like.

The device-specific hardware, software, firmware, and applications 206 may vary from one embodiment of the device 200 to another. For example, the device-specific hardware, software, firmware, and applications 206 will support telephone functions and features when the device 200 is realized as a mobile telephone, conventional personal computer functions and features if the device 200 is realized as a desktop or portable computer, and server functions and features if the device 200 is realized as a messaging server system. In practice, certain portions or aspects of the device-specific hardware, software, firmware, and applications 206 may be implemented in one or more of the other blocks depicted in FIG. 2.

The user interface 208 may include or cooperate with various features to allow a user to interact with the device 200. Accordingly, the user interface 208 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the device 200.

The communication module 210 facilitates data communication between the device 200 and other components as needed during the operation of the device 200. In the context of this description, the communication module 210 can be employed during a messaging session that includes the device 200 as one of the participant devices. An embodiment of the device 200 may support wireless data communication and/or wired data communication, using various data communication protocols. For example, the communication module could support one or more wireless data communication protocols, techniques, or methodologies, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; cellular/wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB. Moreover, the communication module could support one or more wired/cabled data communication protocols, including, without limitation: Ethernet; home network communication protocols; USB; IEEE 1394 (Firewire); hospital network communication protocols; and proprietary data communication protocols.

The display element 212 is suitably configured to enable the device 200 to render and display various screens, graphical user interfaces (GUIs), drop down menus, auto-fill fields, text entry fields, message fields, or the like. Of course, the display element 212 may also be utilized for the display of other information during the operation of the device 200, as is well understood. Notably, the specific configuration, operating characteristics, size, resolution, and functionality of the display element 212 can vary depending upon the practical implementation of the device 200. For example, if the device 200 is a desktop computer, then the display element 212 may be a relatively large monitor. Alternatively, if the device 200 is a cellular telephone device, then the display element 212 may be a relatively small integrated display screen, which may be realized as a touch screen.

The messaging application 214 represents the hardware, software, firmware, and/or processing logic that supports the various intelligent messaging features and functions described here. In certain embodiments, the messaging application 214 and the message prediction engine 216 are implemented together as one functional module—FIG. 2 depicts them as distinct elements for ease of illustration. The messaging application 214 cooperates with the message prediction engine 216, which is suitably configured to obtain message context data associated with a messaging session, and process or analyze the message context data to determine or predict a messaging scenario corresponding to the current messaging session. In turn, the predicted messaging scenario is utilized to obtain, access, or generate appropriate message content for use as suggestions to a participant of the messaging system. It should be appreciated that the messaging application 214 and the message prediction engine 216 need not be implemented in each and every device in the messaging system. Rather, as mentioned above with reference to FIG. 1, the intelligent messaging application 110 could be centrally deployed at the messaging server system 106 in certain embodiments. Alternatively, in other embodiments the intelligent messaging application 110 could be implemented at the user devices 102, 104.

Figure 3:
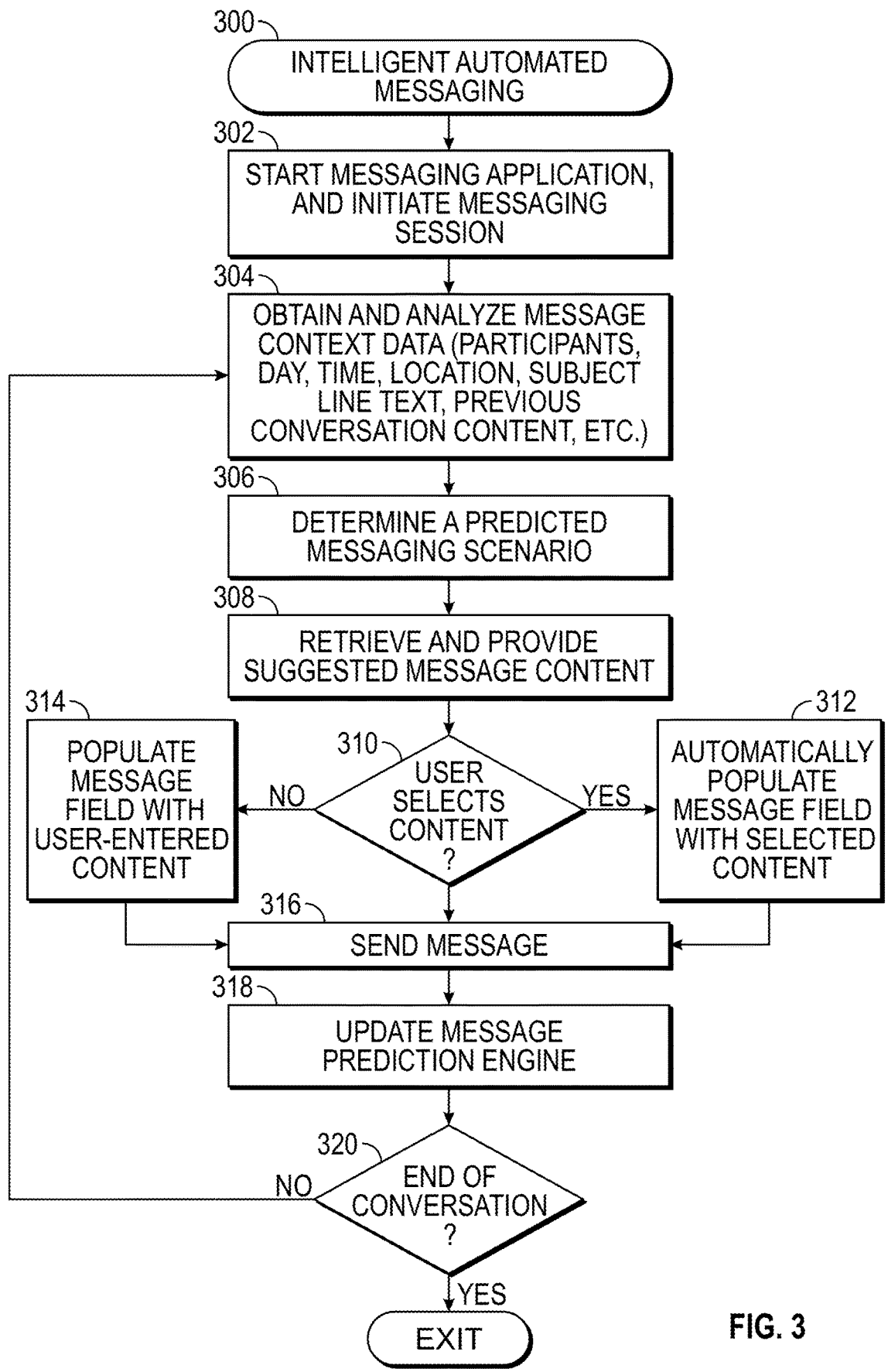
FIG. 3 is a flow chart that illustrates an exemplary embodiment of an intelligent messaging process.

FIG. 3 is a flow chart that illustrates an exemplary embodiment of an intelligent messaging process 300, which may be carried out by a messaging system such as that depicted in FIG. 1. Accordingly, the process 300 may be realized as a computer-implemented method of intelligent predictive messaging. The various tasks performed in connection with the process 300 may be performed by software, hardware, firmware, or any combination thereof. For illustrative purposes, the following description of the process 300 may refer to elements mentioned above in connection with FIG. 1 and FIG. 2. In practice, portions of the process 300 may be performed by different elements of the described system, e.g., a user device, a messaging server system, or a component or element thereof. It should be appreciated that the process 300 may include any number of additional or alternative tasks, the tasks shown in FIG. 3 need not be performed in the illustrated order, and the process 300 may be incorporated into a more comprehensive procedure or process having additional functionality not described in detail herein. Moreover, one or more of the tasks shown in FIG. 3 could be omitted from an embodiment of the process 300 as long as the intended overall functionality remains intact.

The process 300 begins by starting a messaging application (task 302), which initiates a messaging session. In certain embodiments, task 302 is performed in response to some user interaction with a user device, e.g., the launching of an IM application, accessing an online chat feature in a web browser, or the like. In other embodiments, task 302 is performed at a messaging server system that handles and manages messaging sessions for participants. For this basic example, the messaging session is carried out between a first user (of a first user device) and a second user (of a second user device). At an appropriate time, the process 300 obtains and analyzes certain message context data that is associated with the current messaging session (task 304). The message context data may be collected and obtained at a user device for purposes of local processing, or it may be received at a messaging server system for processing. In this regard, the messaging server system could receive the message context data from the user devices in an ongoing manner. For purposes of this example, it is assumed that the message context data is obtained and processed locally at the user device.

The message context data can be any information that individually or collectively is indicative of the current messaging scenario, context, application, or situation, where different scenarios call for different message content, different message tone, different message formality, etc. The message context data may be obtained using native components, sensors, software, applications, transducers, or elements resident at the user device itself. Alternatively or additionally, the message context data may be obtained from external sources, which may be available to the user devices and/or to the messaging server system.

Depending upon the particular embodiment, the message context data may include information related to or otherwise indicative of any of the following items, without limitation: the identification (names, user identifiers, email addresses) of at least one participant of the messaging session; a time associated with the messaging session (such as the start time or the current real time); location information that indicates a location of the user device, which could be obtained using, for example, global positioning system data; the current day of the week; the current date; the subject line text of the message; historical message content associated with the current messaging session; historical message content of previous conversations between the same participants; calendar or schedule information associated with at least one participant of the current messaging session; or the like. Some or all of the collected message context data can be dynamically processed and analyzed by the process 300 in an attempt to predict the flow, meaning, tone, and/or context of the conversation.

The process 300 may utilize a message prediction engine that is suitably configured to determine a predicted messaging scenario (task 306) corresponding to the current messaging session. The message prediction engine may leverage any number of smart algorithms, learning methodologies, training procedures, artificial intelligence, expert system technology, or the like. The message prediction engine can "learn" certain characteristics of conversations that tend to be repeated, frequently occurring, or commonly used. For example, the engine can be trained to recognize conversation patterns, commonly used phrases, greetings, or signature lines, whether a conversation uses formal or informal language, or the like. Moreover, the engine can be updated and refined in an ongoing and dynamic manner such that the predictive nature of the engine improves over time. This example assumes that the message prediction engine has already been trained to at least a baseline level that enables it to generate plausible predictions. Task 306 therefore determines a predicted messaging scenario based upon the message context data. In other words, the predicted messaging scenario will be influenced by the particular message context data that has been considered for the current messaging session.

A predicted messaging scenario may be defined in any appropriate manner, using any number of parameters. For example, a predicted messaging scenario may be specific to the participants of the messaging session, it may be dependent on the current time, and it may relate to the subject line of the conversation. Moreover, there could be situations where the process 300 determines that it cannot accurately predict a plausible messaging scenario. Under those circumstances, the process 300 may exit or simply provide no suggested content to the user.

This example assumes that the process 300 determines or otherwise recognizes a predicted messaging scenario that "matches" the message context data. Accordingly, the process 300 continues by obtaining, retrieving, and providing suggested or recommended message content to the user device (task 308). The recommended content will be influenced and driven by the predicted messaging scenario, which in turn is influenced and dictated by the message context data collected during task 304. If the process 300 has not had enough time to "train" itself or to otherwise learn the user's conversation patterns, habits, and tendencies, then it may default to a state where little to no message content is provided. This example assumes that at least some recommended content is provided and presented at the user device. In certain embodiments, the suggested message content is displayed to the user so that the user can select one of a plurality of different recommended lines of text (i.e., suggested entries) for use with the next message. In such situations, the available lines of text could be displayed in the form of an automatically generated drop-down menu or list, or a scrollable list that the user can navigate via arrow keys, a pointing device, or the like. Thus, a plurality of suggested entries can be provided at the user device in a user-selectable format to accommodate user selection of suggested content.

In certain embodiments, the suggested content or entries is provided to the user device by activating an intelligent auto-fill technique. For example, the suggested content may dynamically change or be dynamically updated in real-time as the user selects, accepts, or types over the suggested content. Accordingly, the user may have the ability to accept or overwrite the suggested content in a line-by-line manner. If the user begins to enter text into a message field or text entry field, the process 300 can immediately respond to the user-entered data by automatically generating and presenting updated suggestions that include the letters, words, or phrases typed by the user. For example, if the user begins to type "Are we . . . " the process 300 might recognize this pattern (especially if certain participants are named) and initiate an auto-fill procedure to complete the message for the user and make the completed message available for acceptance by the user. Thus, the process 300 might provide the following automatically completed line to the user: "Are we GOING TO LUNCH TODAY?" (where the capitalized text indicates the suggested language. Depending upon the predicted scenario, the process 300 may provide more than one suggestion for the message text, e.g., "Are we READY TO LEAVE NOW?" or "Are we HAVING A MEETING?"

If the user selects one of the recommended messages (the "Yes" branch of query task 310), then the process 300 automatically populates the message field of the user device with the selected message content (task 312). If the user does not make a selection (the "No" branch of query task 310), then the process 300 populates the message field with user-entered message content, in accordance with traditional text entry procedures (task 314). A suggested message could be automatically populated and then revised, supplemented, or otherwise edited by the user if so desired. After the user is satisfied with the message text, the user device sends the message (task 316) using the native messaging protocol. This example assumes that the message sent from the user device includes at least some of the suggested content. In certain embodiments, the intelligent message prediction engine (e.g., a machine learning application) can be updated with the results of the process 300 (task 318) such that the system can make better informed suggested in the future. Thus, the engine is updated, enhanced, or improved in response to the sending of the current message and in response to the actual message content associated with the current messaging session.

If the conversation has ended (query task 320), then the process 300 may exit. Otherwise, the process 300 may return to task 304 to proceed as described above. Accordingly, the intelligent message recommendations can proceed in an ongoing manner throughout the IM conversation to predict the next line of text and to make it quicker and easier for the user to generate and send messages.

Figure 4:
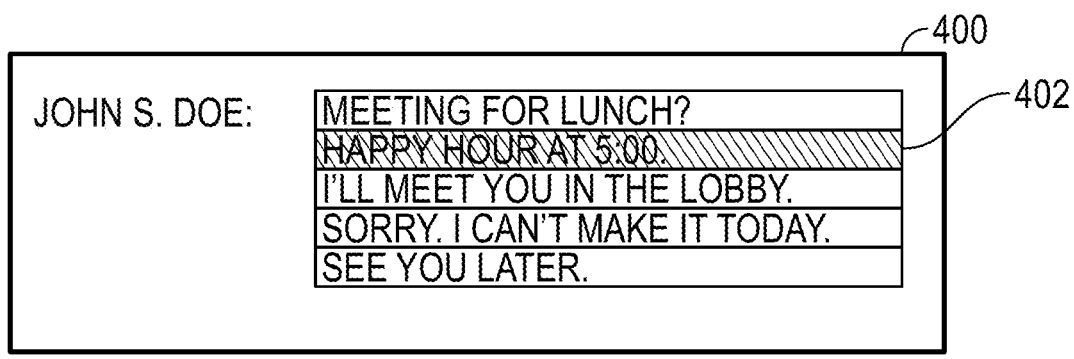
FIG. 4 is a diagram that illustrates recommended message content presented on a user device.

FIG. 4 is a diagram that illustrates an example of recommended message content generated by the messaging system. FIG. 4 depicts a message window 400 that can be used for an IM conversation between the user (John S. Doe) and any number of other participants. The message window 400 represents a condition where the intelligent messaging system has recommended five possible messages suitable for use by the user. These five messages have been deemed relevant or contextually related to the currently detected scenario, operating conditions, etc. In this particular embodiment, the suggested content is displayed in a "drop down" manner such that the user can select any one of the messages. Selection of a message may be accomplished with a pointing device (such as a mouse) or by using the arrow buttons of keyboard, for example. The example shown in FIG. 4 assumes that the user has selected the highlighted message 402, namely, the message that reads "HAPPY HOUR AT 5:00."

Figure 5:
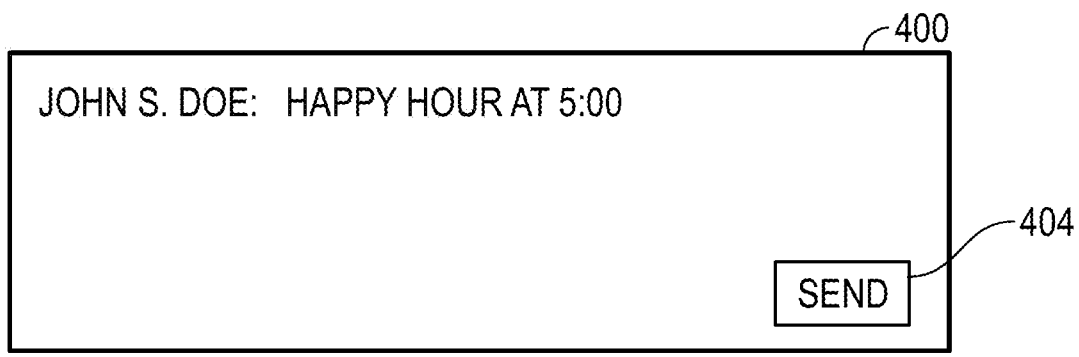
FIG. 5 is a diagram that illustrates a message field of a user device populated with suggested message content.

After selecting the highlighted message 402, the message window 400 transitions to the state depicted in FIG. 5. In this state, the selected message has been automatically entered into the text message field, where the user may add additional text, modify the populated text, delete the populated text, etc. Activation of the "Send" button 404 causes the displayed text to be sent as the next outgoing message.

After receiving a reply, the intelligent messaging system can analyze the reply and the overall conversation for purposes of recommending one or more follow up messages, as described above. In this way, the entire conversation can be guided by the intelligent messaging system, resulting in less typing, less human error, and less time consumed.

The exemplary embodiments presented here relate to various computer-implemented and computer-executed techniques related to messaging systems and the processing of messages to be sent by messaging systems. The described subject matter could be implemented in connection with any suitable computer-based architecture, system, network, or environment, such as two or more user devices that communicate via a data communication network. Although the subject matter presented here could be utilized in connection with any type of computing environment, certain exemplary embodiments can be implemented in conjunction with a multi-tenant database environment.

Figure 6:
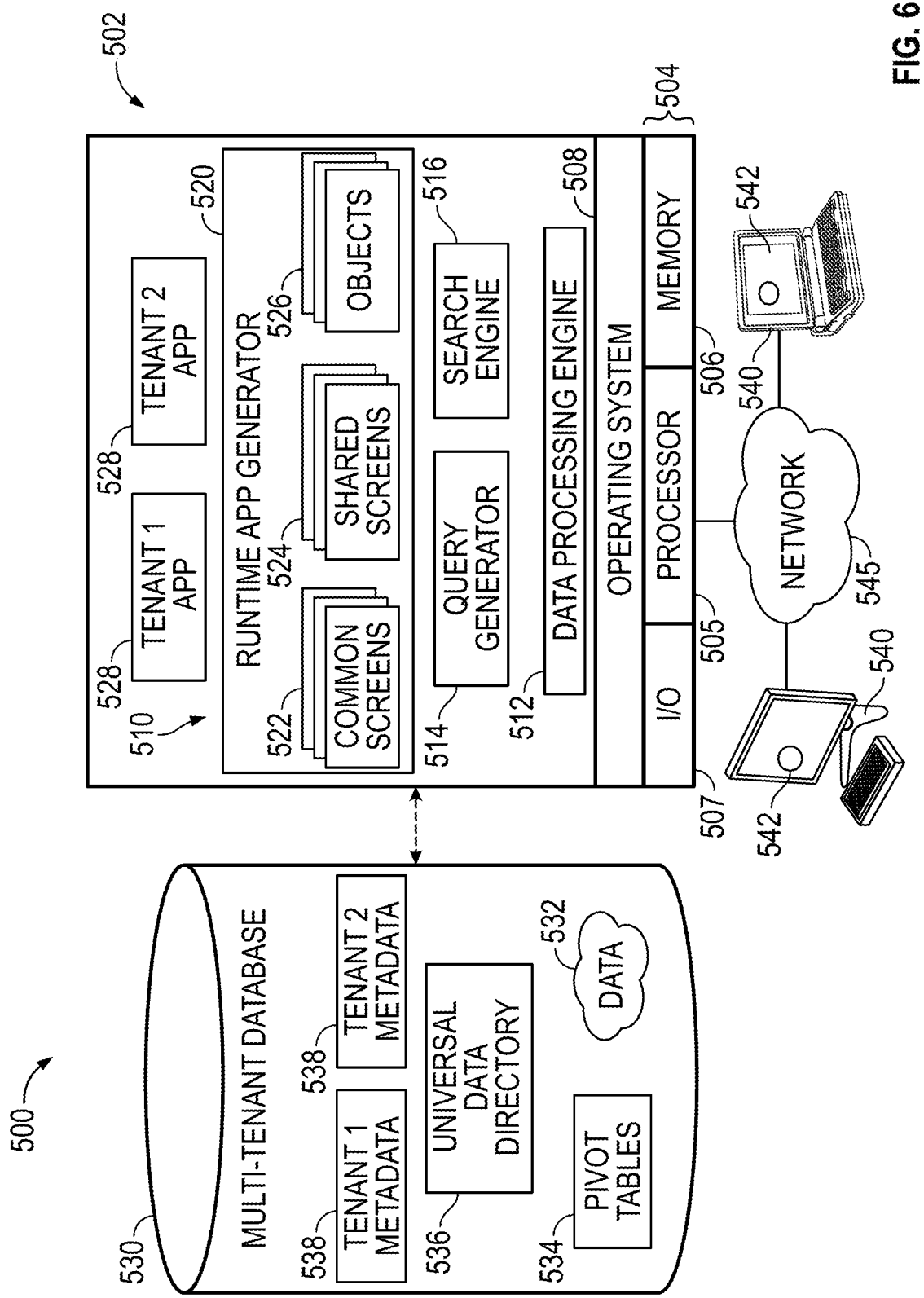
FIG. 6 is a schematic representation of an exemplary embodiment of a multi-tenant application system.

In this regard, an exemplary embodiment of a multi-tenant application system 500 is shown in FIG. 6. The system 500 suitably includes a server 502 that dynamically creates virtual applications 528 based upon data 532 from a common database 530 that is shared between multiple tenants. Data and services generated by the virtual applications 528 are provided via a network 545 to any number of user devices 540, as desired. Each virtual application 528 is suitably generated at run-time using a common application platform 510 that securely provides access to the data 532 in the database 530 for each of the various tenants subscribing to the system 500. In accordance with one non-limiting example, the system 500 may be implemented in the form of a multi-tenant CRM system that can support any number of authenticated users of multiple tenants.

A "tenant" or an "organization" generally refers to a group of users that shares access to common data within the database 530. Tenants may represent customers, customer departments, business or legal organizations, and/or any other entities that maintain data for particular sets of users within the system 500. Although multiple tenants may share access to the server 502 and the database 530, the particular data and services provided from the server 502 to each tenant can be securely isolated from those provided to other tenants. The multi-tenant architecture therefore allows different sets of users to share functionality without necessarily sharing any of the data 532.

The database 530 is any sort of repository or other data storage system capable of storing and managing the data 532 associated with any number of tenants. The database 530 may be implemented using any type of conventional database server hardware. In various embodiments, the database 530 shares processing hardware 504 with the server 502. In other embodiments, the database 530 is implemented using separate physical and/or virtual database server hardware that communicates with the server 502 to perform the various functions described herein.

The data 532 may be organized and formatted in any manner to support the application platform 510. In various embodiments, the data 532 is suitably organized into a relatively small number of large data tables to maintain a semi-amorphous "heap"-type format. The data 532 can then be organized as needed for a particular virtual application 528. In various embodiments, conventional data relationships are established using any number of pivot tables 534 that establish indexing, uniqueness, relationships between entities, and/or other aspects of conventional database organization as desired.

Further data manipulation and report formatting is generally performed at run-time using a variety of metadata constructs. Metadata within a universal data directory (UDD) 536, for example, can be used to describe any number of forms, reports, workflows, user access privileges, business logic and other constructs that are common to multiple tenants. Tenant-specific formatting, functions and other constructs may be maintained as tenant-specific metadata 538 for each tenant, as desired. Rather than forcing the data 532 into an inflexible global structure that is common to all tenants and applications, the database 530 is organized to be relatively amorphous, with the pivot tables 534 and the metadata 538 providing additional structure on an as-needed basis. To that end, the application platform 510 suitably uses the pivot tables 534 and/or the metadata 538 to generate "virtual" components of the virtual applications 528 to logically obtain, process, and present the relatively amorphous data 532 from the database 530.

The server 502 is implemented using one or more actual and/or virtual computing systems that collectively provide the dynamic application platform 510 for generating the virtual applications 528. The server 502 operates with any sort of conventional processing hardware 504, such as a processor 505, memory 506, input/output features 507 and the like. The processor 505 may be implemented using one or more of microprocessors, microcontrollers, processing cores and/or other computing resources spread across any number of distributed or integrated systems, including any number of "cloud-based" or other virtual systems. The memory 506 represents any non-transitory short or long term storage capable of storing programming instructions for execution on the processor 505, including any sort of random access memory (RAM), read only memory (ROM), flash memory, magnetic or optical mass storage, and/or the like. The server 502 typically includes or cooperates with some type of computer-readable media, where a tangible computer-readable medium has computer-executable instructions stored thereon. The computer-executable instructions, when read and executed by the server 502, cause the server 502 to perform certain tasks, operations, functions, and processes described in more detail herein. In this regard, the memory 506 may represent one suitable implementation of such computer-readable media. Notably, the processor 505 and the memory 506 may be suitably configured to carry out the various intelligent messaging and prediction features described above.

The input/output features 507 represent conventional interfaces to networks (e.g., to the network 545, or any other local area, wide area or other network), mass storage, display devices, data entry devices and/or the like. In a typical embodiment, the application platform 510 gains access to processing resources, communications interfaces and other features of the processing hardware 504 using any sort of conventional or proprietary operating system 508. As noted above, the server 502 may be implemented using a cluster of actual and/or virtual servers operating in conjunction with each other, typically in association with conventional network communications, cluster management, load balancing and other features as appropriate.

The application platform 510 is any sort of software application or other data processing engine that generates the virtual applications 528 that provide data and/or services to the user devices 540. The virtual applications 528 are typically generated at run-time in response to queries received from the user devices 540. For the illustrated embodiment, the application platform 510 includes a bulk data processing engine 512, a query generator 514, a search engine 516 that provides text indexing and other search functionality, and a runtime application generator 520. Each of these features may be implemented as a separate process or other module, and many equivalent embodiments could include different and/or additional features, components or other modules as desired.

The runtime application generator 520 dynamically builds and executes the virtual applications 528 in response to specific requests received from the user devices 540. The virtual applications 528 created by tenants are typically constructed in accordance with the tenant-specific metadata 538, which describes the particular tables, reports, interfaces and/or other features of the particular application. In various embodiments, each virtual application 528 generates dynamic web content (including GUIs, detail views, secondary or sidebar views, and the like) that can be served to a browser or other client program 542 associated with its user device 540, as appropriate.

The runtime application generator 520 suitably interacts with the query generator 514 to efficiently obtain multi-tenant data 532 from the database 530 as needed. In a typical embodiment, the query generator 514 considers the identity of the user requesting a particular function, and then builds and executes queries to the database 530 using system-wide metadata 536, tenant specific metadata 538, pivot tables 534, and/or any other available resources. The query generator 514 in this example therefore maintains security of the common database 530 by ensuring that queries are consistent with access privileges granted to the user that initiated the request.

The data processing engine 512 performs bulk processing operations on the data 532 such as uploads or downloads, updates, online transaction processing, and/or the like. In many embodiments, less urgent bulk processing of the data 532 can be scheduled to occur as processing resources become available, thereby giving priority to more urgent data processing by the query generator 514, the search engine 516, the virtual applications 528, etc. In certain embodiments, the data processing engine 512 and the processor 505 cooperate in an appropriate manner to perform and manage various techniques, processes, and methods associated with intelligent messaging, as described previously with reference to FIGS. 1-5.

In operation, developers use the application platform 510 to create data-driven virtual applications 528 for the tenants that they support. Such virtual applications 528 may make use of interface features such as tenant-specific screens 524, universal screens 522 or the like. Any number of tenant-specific and/or universal objects 526 may also be available for integration into tenant-developed virtual applications 528. The data 532 associated with each virtual application 528 is provided to the database 530, as appropriate, and stored until it is requested or is otherwise needed, along with the metadata 538 that describes the particular features (e.g., reports, tables, functions, etc.) of that particular tenant-specific virtual application 528. For example, a virtual application 528 may include a number of objects 526 accessible to a tenant, wherein for each object 526 accessible to the tenant, information pertaining to its object type along with values for various fields associated with that respective object type are maintained as metadata 538 in the database 530. In this regard, the object type defines the structure (e.g., the formatting, functions and other constructs) of each respective object 526 and the various fields associated therewith. In an exemplary embodiment, each object type includes one or more fields for indicating the relationship of a respective object of that object type to one or more objects of a different object type (e.g., master-detail, lookup relationships, or the like).

In exemplary embodiments, the application platform 510, the data processing engine 512, the query generator 514, and the processor 505 cooperate in an appropriate manner to process data associated with a hosted virtual application 528 (such as a CRM application), generate and provide suitable GUIs (such as web pages) for presenting data on client devices 540, and perform additional techniques, processes, and methods to support the features and functions related to the provision of messaging features and functions for the hosted virtual application 528.

Still referring to FIG. 6, the data and services provided by the server 502 can be retrieved using any sort of personal computer, mobile telephone, portable device, tablet computer, or other network-enabled user device 540 that communicates via the network 545. Typically, the user operates a conventional browser or other client program 542 to contact the server 502 via the network 545 using, for example, the hypertext transport protocol (HTTP) or the like. The user typically authenticates his or her identity to the server 502 to obtain a session identifier ("SessionID") that identifies the user in subsequent communications with the server 502. When the identified user requests access to a virtual application 528, the runtime application generator 520 suitably creates the application at run time based upon the metadata 538, as appropriate. The query generator 514 suitably obtains the requested data 532 from the database 530 as needed to populate the tables, reports or other features of the particular virtual application 528. As noted above, the virtual application 528 may contain Java, ActiveX, or other content that can be presented using conventional client software running on the user device 540; other embodiments may simply provide dynamic web or other content that can be presented and viewed by the user, as desired.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a tangible non-transitory processor-readable medium in certain embodiments. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, or the like.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A computer-implemented method of smart messaging, the method comprising:
   obtaining, at a machine learning application from a user device, message context data indicative of context of a conversation during a messaging session;
   processing the message context data indicative of the context of the conversation, at a processor executing the machine learning application, to determine, based on prior conversation patterns, a predicted conversation pattern of the conversation that is taking place;
   determining, at the processor executing the machine learning application based on the predicted conversation pattern, options for suggested responses that are predicted to compete at least part of a response message as part of the conversation, wherein each of the options for suggested responses corresponds to the message context data indicative of the context of the conversation; and
   displaying, via a graphical user interface, one of the suggested responses within a message field in response to selection of that suggested response.

2. The method of claim 1, wherein the machine learning application is implemented at the user device.

3. The method of claim 1, wherein the machine learning application is implemented at a computing system that is communicatively coupled to the user device via a network.

4. The method of claim 1, wherein displaying comprises:
   displaying, via the graphical user interface, the one of the suggested responses within the message field at the user device.

5. The method of claim 1, wherein the user device is a first user device, and wherein displaying comprises:
   displaying, via the graphical user interface, the one of the suggested responses within the message field at a second user device that is part of the messaging session with the first user device.

6. The method of claim 1, wherein displaying further comprises:
   automatically populating the message field with the one of the suggested responses in response to the selection input indicating selection of that suggested response; and after automatically populating, sending the response message from the user device, the response message including the one of the suggested responses that has been automatically populated in the message field.

7. The method of claim 1, wherein the message is an email message, and wherein the message context data comprises at least one of: text from a subject line of a prior email message of the conversation and message content of the prior email message of the conversation.

8. The method of claim 1, wherein the message is a text message, and wherein the message context data comprises: message content of a prior text message of the conversation.

9. The method of claim 1, wherein processing comprises:
processing the message context data indicative of the context of the conversation, at the processor executing the machine learning application, to determine, based on the prior conversation patterns, a predicted messaging scenario of the conversation, wherein the predicted messaging scenario includes: the predicted conversation pattern of the conversation that is taking place between participants in the conversation.

10. The method of claim 1, wherein the machine learning application is configured to learn certain characteristics of conversations comprising: conversation patterns, commonly used phrases, and whether a conversation uses formal or informal language, and wherein the method further comprises:
updating, after processing the message context data, the machine learning application such that a predictive nature of the machine learning application improves suggested responses over time.

11. The method of claim 1, wherein each of the options for suggested responses comprise: different recommended text that corresponds to the message context data and indicates suggested language to complete at least part of the response message; and
wherein the method further comprises:
providing the options for suggested responses for presentation at the user device via the graphical user interface;
selecting one of the options for suggested responses, resulting in a selected option; and
wherein automatically populating the message field comprises:
automatically populating the message field with the selected option.

12. The method of claim 11, wherein:
the options for suggested responses are provided in a user-selectable format; and
the selecting is performed in response to user selection of one of the options for suggested responses.

13. The method of claim 1, wherein the message context data comprises at least one of:
historical message content of previous conversations.

14. A computer-implemented method of smart messaging, the method comprising:
initiating a messaging session between a first user of first user device and a second user of a second user device, wherein the first user and the second user are participants in a conversation taking place as part of the messaging session;
receiving, at a machine learning application from the first user device or the second user device, message context data associated with the messaging session that indicates a characteristic of the conversation;
determining, at a processor executing the machine learning application based on the characteristic of the conversation that is indicative of context of the conversation and based on prior conversation patterns, a predicted conversation pattern of the conversation;
determining, at the processor executing the machine learning application based on the predicted conversation pattern, options for suggested responses that are predicted to compete at least part of a response message as part of the conversation, wherein each of the options for suggested responses corresponds to the characteristic of the conversation indicative of the context of the conversation; and
providing, to the first user device or to the second user device, one of the suggested responses; and
displaying, via a graphical user interface, that suggested response within a message field at the first user device or the second user device.

15. The system of claim 14, wherein the machine learning application is implemented at the first user device.

16. The system of claim 14, wherein the machine learning application is implemented at the second user device.

17. The system of claim 14, further comprising:
a computing system that is communicatively coupled to the first user device and the second user device via a network, wherein the machine learning application is implemented at the computing system.

18. The system of claim 14, wherein determining, at a processor executing a machine learning application based on a characteristic of the conversation that is indicative of context of the conversation, a predicted conversation pattern of the conversation, comprises:
determining, at the processor executing the machine learning application based on the characteristic of the conversation that is indicative of context of the conversation and the prior conversation patterns between those participants of the conversation, a predicted messaging scenario that includes the predicted conversation pattern of the conversation that is taking place between the first user and the second user during the messaging session, wherein the first user and the second user are users, and wherein the suggested responses are influenced by the predicted messaging scenario.

19. The system of claim 14, wherein each of the options for suggested responses comprise:
different recommended text that corresponds to the message context data and indicates suggested language to complete at least part of the response message.

20. A computer-implemented system, comprising:
a first user device; and
a system configured to execute a machine learning application, the system comprising: a processor and a memory, wherein the memory comprises a non-transitory computer-readable-medium having computer-executable instructions for the machine learning application stored therein that, when executed by the processor, cause the processor to:
obtain, at the machine learning application from the first user device, message context data indicative of context of a conversation taking place between a first user of the first user device and a second user of a second user device;
analyze the message context data indicative of the context of the conversation, at the machine learning application, to determine, based on prior conversation patterns between the first user and the second user, a predicted conversation pattern of the conversation that is taking place between the first user and the second user who are participating in the conversation;

generate, at the machine learning application based on the predicted conversation pattern, options for suggested responses that are predicted to compete at least part of a response message as part of the conversation, wherein each of the options for suggested responses corresponds to the message context data indicative of the context of the conversation; and provide one of the suggested responses to either the first user device or the second user device.

21. The system of claim 20, wherein the system is part of the first user device, and wherein the machine learning application is implemented at the first user device, wherein the one of the suggested responses is presented, via a graphical user interface, within a message field at the first user device, and automatically populates the message field with one of the suggested responses in response to selection of that suggested response.

22. The system of claim 20, wherein the system is the second user device that is participating in the messaging session with the first user device, wherein the machine learning application is implemented at the second user device, wherein the one of the suggested responses is presented within a message field at the second user device, and automatically populates the message field with one of the suggested responses in response to selection of that suggested response.

23. The system of claim 20, wherein the system is a computing system that is communicatively coupled to the first user device via a network, wherein the machine learning application is implemented at the computing system, wherein the one of the suggested responses is presented within a message field at the first user device or the second user device, and automatically populates the message field with one of the suggested responses in response to selection of that suggested response.

* * * * *

UNITED STATES PATENT AND TRADEMARK OFFICE
CERTIFICATE OF CORRECTION

PATENT NO. : 10,601,739 B2  
APPLICATION NO. : 16/200351  
DATED : March 24, 2020  
INVENTOR(S) : Dipak Patil Page 1 of 1

It is certified that error appears in the above-identified patent and that said Letters Patent is hereby corrected as shown below:

On the Title Page

Item (57) Abstract, Line 10, cancel the word "compete" and insert the word --complete--

In the Claims

Claim 1, Column 14, Line 39, cancel the word "compete" and insert the word --complete--
Claim 14, Column 16, Line 6, cancel the word "compete" and insert the word --complete--
Claim 20, Column 17, Line 3, cancel the word "compete" and insert the word --complete--

Signed and Sealed this
Twenty-first Day of July, 2020

Andrei Iancu
*Director of the United States Patent and Trademark Office*